(12) United States Patent
Monaco

(10) Patent No.: US 11,232,409 B2
(45) Date of Patent: Jan. 25, 2022

(54) PRESENTING ENTITY PROFILE INFORMATION TO A USER OF A COMPUTING DEVICE

(71) Applicant: VERIZON MEDIA INC., New York, NY (US)

(72) Inventor: Peter Monaco, Los Altos, CA (US)

(73) Assignee: VERIZON MEDIA INC., New York, NY (US)

( * ) Notice: Subject to any disclaimer, the term of this patent is extended or adjusted under 35 U.S.C. 154(b) by 688 days.

(21) Appl. No.: 15/688,015

(22) Filed: Aug. 28, 2017

(65) Prior Publication Data

US 2018/0046985 A1    Feb. 15, 2018

Related U.S. Application Data

(63) Continuation of application No. 13/534,612, filed on Jun. 27, 2012, now Pat. No. 9,747,583.

(51) Int. Cl.
  *G06Q 10/10*    (2012.01)
  *H04L 29/08*    (2006.01)
  (Continued)

(52) U.S. Cl.
  CPC ........... *G06Q 10/107* (2013.01); *G06F 16/38* (2019.01); *G06F 16/9535* (2019.01);
  (Continued)

(58) Field of Classification Search
  CPC ............... G06Q 10/107; G06Q 50/01; G06F 17/30722; G06F 17/30902;
  (Continued)

(56) References Cited

U.S. PATENT DOCUMENTS

| 5,396,647 A | 3/1995 | Thompson et al. |
| 5,610,915 A | 3/1997 | Elliott et al. |

(Continued)

FOREIGN PATENT DOCUMENTS

| CN | 101351818 | 1/2009 |
| EP | 0944002 | 9/1999 |

(Continued)

OTHER PUBLICATIONS

Network Working Group, Request for Comments 2822—Internet Message Format at *6 (Apr. 2001) (available at <https://tools.ietf.org/pdf/rfc2822.pdf>) (Year: 2001).*

(Continued)

*Primary Examiner* — Justin R. Blaufeld
(74) *Attorney, Agent, or Firm* — James J. DeCarlo; Greenberg Traurig, LLP

(57) ABSTRACT

Entity profile information is presented to a user of a computing device. In one embodiment, a method includes: receiving a communication associated with a first entity; in response to receiving the communication, creating or updating, by at least one processor, a first entity profile, wherein the first entity profile is for display to the user on the computing device; and storing a plurality of entity profiles for entities, the entity profiles including the first entity profile.

20 Claims, 6 Drawing Sheets

Related U.S. Application Data

(60) Provisional application No. 61/503,570, filed on Jun. 30, 2011.

(51) Int. Cl.
*H04L 12/58* (2006.01)
*G06F 16/38* (2019.01)
*G06F 16/9535* (2019.01)
*G06F 16/957* (2019.01)
*G06Q 50/00* (2012.01)

(52) U.S. Cl.
CPC .......... *G06F 16/9574* (2019.01); *H04L 51/16* (2013.01); *H04L 67/30* (2013.01); *H04L 67/306* (2013.01); *G06Q 50/01* (2013.01)

(58) Field of Classification Search
CPC ............... G06F 17/30867; G06F 16/38; G06F 16/9535; G06F 16/9574; H04L 67/30; H04L 67/306; H04L 51/16
See application file for complete search history.

(56) References Cited

U.S. PATENT DOCUMENTS

| | | |
|---|---|---|
| 5,966,714 A | 10/1999 | Huang et al. |
| 6,020,884 A | 2/2000 | MacNaughton et al. |
| 6,285,999 B1 | 9/2001 | Page |
| 6,321,187 B1 | 11/2001 | Squier et al. |
| 6,385,644 B1 | 5/2002 | Devine et al. |
| 6,405,197 B2 * | 6/2002 | Gilmour ............ G06F 21/6218 707/805 |
| 6,484,196 B1 | 11/2002 | Maurille |
| 6,502,131 B1 | 12/2002 | Vaid et al. |
| 6,510,453 B1 | 1/2003 | Apfel et al. |
| 6,560,620 B1 | 5/2003 | Ching |
| 6,594,654 B1 | 7/2003 | Salam et al. |
| 6,606,744 B1 | 8/2003 | Mikurak |
| 6,615,348 B1 | 9/2003 | Gibbs |
| 6,714,967 B1 | 3/2004 | Horvitz |
| 6,721,748 B1 | 4/2004 | Knight et al. |
| 6,816,850 B2 | 11/2004 | Culliss |
| 6,832,245 B1 | 12/2004 | Isaacs et al. |
| 6,931,419 B1 | 8/2005 | Lindquist |
| 6,952,805 B1 | 10/2005 | Tafoya et al. |
| 6,965,918 B1 | 11/2005 | Arnold et al. |
| 6,996,777 B2 | 2/2006 | Hiipakka |
| 7,003,724 B2 | 2/2006 | Newman |
| 7,058,892 B1 | 6/2006 | MacNaughton et al. |
| 7,076,533 B1 | 7/2006 | Knox et al. |
| 7,085,745 B2 | 8/2006 | Klug |
| 7,103,806 B1 | 9/2006 | Horvitz |
| 7,149,985 B1 | 12/2006 | Crosby et al. |
| 7,181,518 B1 | 2/2007 | Matsumoto et al. |
| 7,185,065 B1 | 2/2007 | Holtzman et al. |
| 7,187,932 B1 | 3/2007 | Barchi |
| 7,246,045 B1 | 7/2007 | Rappaport et al. |
| 7,272,637 B1 | 9/2007 | Himmelstein |
| 7,289,614 B1 | 10/2007 | Twerdahl et al. |
| 7,328,242 B1 | 2/2008 | McCarthy et al. |
| 7,333,976 B1 | 2/2008 | Auerbach et al. |
| 7,359,894 B1 | 4/2008 | Liebman et al. |
| 7,383,307 B2 | 6/2008 | Kirkland et al. |
| 7,444,323 B2 | 10/2008 | Martinez et al. |
| 7,454,464 B2 | 11/2008 | Puthenkulam et al. |
| 7,475,109 B1 | 1/2009 | Fletcher et al. |
| 7,475,113 B2 | 1/2009 | Stolze |
| 7,478,361 B2 | 1/2009 | Peteanu et al. |
| 7,512,788 B2 | 3/2009 | Choi et al. |
| 7,512,814 B2 | 3/2009 | Chen et al. |
| 7,536,384 B2 | 5/2009 | Venkataraman et al. |
| 7,539,676 B2 | 5/2009 | Aravamudan et al. |
| 7,580,363 B2 | 8/2009 | Sorvari et al. |
| 7,593,995 B1 | 9/2009 | He et al. |
| 7,606,860 B2 | 10/2009 | Puthenkulam et al. |
| 7,610,341 B2 | 10/2009 | Daniell |
| 7,620,407 B1 | 11/2009 | Donald et al. |
| 7,624,103 B2 | 11/2009 | Wiegering et al. |
| 7,627,598 B1 | 12/2009 | Burke |
| 7,634,463 B1 | 12/2009 | Katragadda et al. |
| 7,639,157 B1 | 12/2009 | Whitley et al. |
| 7,653,695 B2 | 1/2010 | Flury et al. |
| 7,685,144 B1 | 3/2010 | Katragadda |
| 7,692,653 B1 | 4/2010 | Petro et al. |
| 7,698,140 B2 | 4/2010 | Bhardwaj et al. |
| 7,702,730 B2 | 4/2010 | Spataro et al. |
| 7,707,249 B2 | 4/2010 | Spataro et al. |
| 7,707,509 B2 | 4/2010 | Naono et al. |
| 7,716,140 B1 | 5/2010 | Nielsen et al. |
| 7,720,916 B2 | 5/2010 | Fisher et al. |
| 7,724,878 B2 | 5/2010 | Timmins et al. |
| 7,725,492 B2 | 5/2010 | Sittig et al. |
| 7,743,051 B1 | 6/2010 | Kashyap et al. |
| 7,752,081 B2 | 7/2010 | Calabria |
| 7,756,895 B1 | 7/2010 | Emigh |
| 7,756,935 B2 | 7/2010 | Gaucas |
| 7,761,436 B2 | 7/2010 | Norton et al. |
| 7,788,260 B2 | 8/2010 | Lunt et al. |
| 7,805,492 B1 | 9/2010 | Thatcher et al. |
| 7,818,396 B2 | 10/2010 | Dolin et al. |
| 7,827,208 B2 | 11/2010 | Bosworth et al. |
| 7,827,265 B2 | 11/2010 | Cheever et al. |
| 7,831,692 B2 | 11/2010 | French et al. |
| 7,836,045 B2 | 11/2010 | Schachter |
| 7,836,134 B2 | 11/2010 | Pantalone |
| 7,849,141 B1 | 12/2010 | Bellegarda et al. |
| 7,849,142 B2 | 12/2010 | Clegg et al. |
| 7,853,602 B2 | 12/2010 | Gorti et al. |
| 7,853,881 B1 | 12/2010 | Aly Assal et al. |
| 7,865,562 B2 | 1/2011 | Nesbitt et al. |
| 7,870,197 B2 | 1/2011 | Lewis et al. |
| 7,899,806 B2 | 3/2011 | Aravamudan et al. |
| 7,899,871 B1 | 3/2011 | Kumar et al. |
| 7,908,647 B1 | 3/2011 | Polis et al. |
| 7,925,690 B2 | 4/2011 | Smith et al. |
| 7,930,430 B2 | 4/2011 | Thatcher et al. |
| 7,949,611 B1 | 5/2011 | Nielsen et al. |
| 7,949,627 B2 | 5/2011 | Aravamudan et al. |
| 7,970,832 B2 | 6/2011 | Perry, Jr. et al. |
| 7,979,569 B2 | 7/2011 | Eisner et al. |
| 7,991,764 B2 | 8/2011 | Rathod |
| 7,996,456 B2 | 8/2011 | Gross |
| 8,005,806 B2 | 8/2011 | Rupp et al. |
| 8,032,598 B1 | 10/2011 | He et al. |
| 8,055,715 B2 | 11/2011 | Bensky et al. |
| 8,073,928 B2 | 12/2011 | Dolin et al. |
| 8,086,676 B2 | 12/2011 | Palahnuk et al. |
| 8,086,968 B2 | 12/2011 | McCaffrey et al. |
| 8,112,437 B1 | 2/2012 | Katragadda et al. |
| 8,140,566 B2 | 3/2012 | Boerries et al. |
| 8,145,791 B2 | 3/2012 | Thatcher et al. |
| 8,151,358 B1 | 4/2012 | Herold |
| 8,161,122 B2 | 4/2012 | Sood et al. |
| 8,200,761 B1 | 6/2012 | Tevanian |
| 8,200,808 B2 | 6/2012 | Ishida |
| 8,204,897 B1 | 6/2012 | Djabarov et al. |
| 8,239,197 B2 | 8/2012 | Webb et al. |
| 8,244,848 B1 * | 8/2012 | Narayanan ............ G06Q 50/01 709/218 |
| 8,271,025 B2 | 9/2012 | Brisebois et al. |
| 8,284,783 B1 | 10/2012 | Maufer et al. |
| 8,291,019 B1 | 10/2012 | Rochelle et al. |
| 8,296,179 B1 | 10/2012 | Rennison |
| 8,316,315 B2 | 11/2012 | Portnoy et al. |
| 8,363,803 B2 | 1/2013 | Gupta |
| 8,365,235 B2 | 1/2013 | Hunt et al. |
| 8,392,409 B1 | 3/2013 | Kashyap et al. |
| 8,392,836 B1 | 3/2013 | Bau et al. |
| 8,412,174 B2 | 4/2013 | Khosravi |
| 8,423,545 B2 | 4/2013 | Cort et al. |
| 8,433,762 B1 * | 4/2013 | Wald ................ G06F 16/24578 709/206 |
| 8,443,441 B2 | 5/2013 | Stolfo et al. |
| 8,447,789 B2 | 5/2013 | Geller |

(56) References Cited

U.S. PATENT DOCUMENTS

| | | |
|---|---|---|
| 8,452,745 B2 | 5/2013 | Ramakrishna |
| 8,463,872 B2 | 6/2013 | Pounds et al. |
| 8,468,168 B2 | 6/2013 | Brezina et al. |
| 8,495,045 B2 | 7/2013 | Wolf et al. |
| 8,510,389 B1 | 8/2013 | Gurajada et al. |
| 8,522,257 B2 | 8/2013 | Rupp et al. |
| 8,549,412 B2 | 10/2013 | Brezina et al. |
| 8,566,306 B2 | 10/2013 | Jones |
| 8,600,343 B2 | 12/2013 | Brezina et al. |
| 8,606,335 B2 | 12/2013 | Ozaki |
| 8,620,935 B2 | 12/2013 | Rubin et al. |
| 8,661,002 B2 | 2/2014 | Smith et al. |
| 8,666,035 B2 | 3/2014 | Timmins et al. |
| 8,694,633 B2 | 4/2014 | Mansfield et al. |
| 8,706,652 B2 | 4/2014 | Yang et al. |
| 8,745,060 B2 | 6/2014 | Brezina et al. |
| 8,768,291 B2 | 7/2014 | Williams et al. |
| 8,793,625 B2 | 7/2014 | Rhee et al. |
| 8,818,995 B1 | 8/2014 | Guha |
| 8,849,816 B2 | 9/2014 | Burba et al. |
| 8,924,956 B2 | 12/2014 | Smith |
| 8,930,463 B2 | 1/2015 | Bonforte et al. |
| 8,972,257 B2 | 3/2015 | Bonforte |
| 8,984,074 B2 | 3/2015 | Monaco |
| 8,990,323 B2 | 3/2015 | Hein et al. |
| 9,009,065 B2 | 4/2015 | Reis et al. |
| 9,020,938 B2 | 4/2015 | Cort et al. |
| 9,058,366 B2 | 6/2015 | Brezina et al. |
| 9,069,825 B1 | 6/2015 | Chang |
| 9,087,323 B2 | 7/2015 | Hein et al. |
| 9,159,057 B2 | 10/2015 | Monaco |
| 9,195,753 B1 | 11/2015 | King et al. |
| 9,195,969 B2 | 11/2015 | Bau et al. |
| 9,235,848 B1 | 1/2016 | Gourley et al. |
| 9,275,118 B2 | 3/2016 | Brezina et al. |
| 9,275,126 B2 | 3/2016 | Smith et al. |
| 9,298,783 B2 | 3/2016 | Brezina et al. |
| 9,304,621 B1 | 4/2016 | Wakim et al. |
| 9,501,561 B2 | 11/2016 | Rubin et al. |
| 9,569,529 B2 | 2/2017 | Rubin et al. |
| 9,584,343 B2 | 2/2017 | Brezina et al. |
| 9,591,086 B2 | 3/2017 | Brezina et al. |
| 9,594,832 B2 | 3/2017 | Rubin et al. |
| 9,596,308 B2 | 3/2017 | Brezina et al. |
| 9,685,158 B2 | 6/2017 | Bonforte |
| 9,699,258 B2 | 7/2017 | Brezina et al. |
| 9,716,764 B2 | 7/2017 | Brezina et al. |
| 9,721,228 B2 | 8/2017 | Cort et al. |
| 9,747,583 B2 * | 8/2017 | Monaco ............... G06Q 10/107 |
| 9,760,866 B2 | 9/2017 | Quintela et al. |
| 9,800,679 B2 | 10/2017 | Hein et al. |
| 9,819,765 B2 | 11/2017 | Thatcher et al. |
| 9,842,144 B2 | 12/2017 | Cort et al. |
| 9,842,145 B2 | 12/2017 | Cort et al. |
| 9,954,963 B2 | 4/2018 | Brezina et al. |
| 10,069,924 B2 | 9/2018 | Brezina et al. |
| 10,078,819 B2 | 9/2018 | Bonforte |
| 10,089,986 B2 | 10/2018 | Bonforte |
| 2001/0037407 A1 | 11/2001 | Dragulev et al. |
| 2001/0049628 A1 | 12/2001 | Icho |
| 2002/0007310 A1 | 1/2002 | Long |
| 2002/0016818 A1 | 2/2002 | Kirani et al. |
| 2002/0024536 A1 | 2/2002 | Kahan et al. |
| 2002/0049751 A1 | 4/2002 | Chen et al. |
| 2002/0054587 A1 | 5/2002 | Baker et al. |
| 2002/0059402 A1 | 5/2002 | Belanger |
| 2002/0059418 A1 | 5/2002 | Bird et al. |
| 2002/0059425 A1 | 5/2002 | Belfiore et al. |
| 2002/0073011 A1 | 6/2002 | Brattain et al. |
| 2002/0073058 A1 | 6/2002 | Kremer et al. |
| 2002/0076004 A1 | 6/2002 | Brockenbrough et al. |
| 2002/0078090 A1 | 6/2002 | Hwang et al. |
| 2002/0087647 A1 | 7/2002 | Quine et al. |
| 2002/0091777 A1 | 7/2002 | Schwartz |
| 2002/0103873 A1 | 8/2002 | Ramanathan et al. |
| 2002/0103879 A1 | 8/2002 | Mondragon |
| 2002/0107991 A1 | 8/2002 | Maguire et al. |
| 2002/0116396 A1 | 8/2002 | Somers et al. |
| 2002/0143871 A1 | 10/2002 | Meyer et al. |
| 2002/0152216 A1 | 10/2002 | Bouthors |
| 2002/0163539 A1 | 11/2002 | Srinivasan |
| 2002/0194502 A1 | 12/2002 | Sheth et al. |
| 2003/0028525 A1 | 2/2003 | Santos et al. |
| 2003/0037116 A1 | 2/2003 | Nolan et al. |
| 2003/0041030 A1 | 2/2003 | Mansfield |
| 2003/0046311 A1 | 3/2003 | Baidya et al. |
| 2003/0093483 A1 | 5/2003 | Allen et al. |
| 2003/0114956 A1 | 6/2003 | Cullen et al. |
| 2003/0120608 A1 | 6/2003 | Pereyra |
| 2003/0142125 A1 | 7/2003 | Salmimaa et al. |
| 2003/0167324 A1 | 9/2003 | Farnham et al. |
| 2003/0195937 A1 | 10/2003 | Kircher, Jr. et al. |
| 2003/0204439 A1 | 10/2003 | Cullen, III |
| 2003/0217106 A1 | 11/2003 | Adar et al. |
| 2003/0220978 A1 | 11/2003 | Rhodes |
| 2003/0220989 A1 | 11/2003 | Tsuji et al. |
| 2003/0233419 A1 | 12/2003 | Beringer |
| 2004/0002903 A1 | 1/2004 | Stolfo et al. |
| 2004/0015547 A1 | 1/2004 | Griffin et al. |
| 2004/0015554 A1 | 1/2004 | Wilson |
| 2004/0034537 A1 | 2/2004 | Gengarella et al. |
| 2004/0039630 A1 | 2/2004 | Begole et al. |
| 2004/0056901 A1 | 3/2004 | March et al. |
| 2004/0068545 A1 | 4/2004 | Daniell et al. |
| 2004/0073616 A1 | 4/2004 | Fellenstein et al. |
| 2004/0078443 A1 | 4/2004 | Malik |
| 2004/0078444 A1 | 4/2004 | Malik |
| 2004/0078445 A1 | 4/2004 | Malik |
| 2004/0100497 A1 | 5/2004 | Quillen et al. |
| 2004/0128355 A1 | 7/2004 | Chao et al. |
| 2004/0128356 A1 | 7/2004 | Bernstein et al. |
| 2004/0133561 A1 * | 7/2004 | Burke ............... G06Q 10/107 |
| 2004/0133809 A1 | 7/2004 | Dahl et al. |
| 2004/0153504 A1 | 8/2004 | Hutchinson et al. |
| 2004/0162878 A1 | 8/2004 | Lewis et al. |
| 2004/0174964 A1 | 9/2004 | Koch |
| 2004/0177048 A1 | 9/2004 | Klug |
| 2004/0186851 A1 | 9/2004 | Jhingan et al. |
| 2004/0202117 A1 | 10/2004 | Wilson et al. |
| 2004/0205002 A1 | 10/2004 | Layton |
| 2004/0210827 A1 | 10/2004 | Burg et al. |
| 2004/0215726 A1 | 10/2004 | Arning et al. |
| 2004/0236749 A1 | 11/2004 | Cortright et al. |
| 2004/0260756 A1 | 12/2004 | Forstall et al. |
| 2004/0268229 A1 | 12/2004 | Paoli et al. |
| 2005/0015432 A1 * | 1/2005 | Cohen ............... G06Q 10/107 |
| | | 709/201 |
| 2005/0027699 A1 * | 2/2005 | Awadallah ............. G06Q 30/02 |
| 2005/0027779 A1 | 2/2005 | Schinner |
| 2005/0038687 A1 | 2/2005 | Galdes |
| 2005/0044152 A1 | 2/2005 | Hardy et al. |
| 2005/0055409 A1 | 3/2005 | Alsarraf et al. |
| 2005/0055639 A1 | 3/2005 | Fogg |
| 2005/0060638 A1 | 3/2005 | Mathew et al. |
| 2005/0076090 A1 | 4/2005 | Thuerk |
| 2005/0080868 A1 | 4/2005 | Malik |
| 2005/0090911 A1 | 4/2005 | Ingargiola et al. |
| 2005/0091272 A1 | 4/2005 | Smith et al. |
| 2005/0091314 A1 | 4/2005 | Blagsvedt et al. |
| 2005/0102257 A1 | 5/2005 | Onyon et al. |
| 2005/0102361 A1 | 5/2005 | Winjum et al. |
| 2005/0108273 A1 | 5/2005 | Brebner |
| 2005/0131888 A1 | 6/2005 | Tafoya et al. |
| 2005/0138070 A1 | 6/2005 | Huberman et al. |
| 2005/0138631 A1 | 6/2005 | Bellotti et al. |
| 2005/0149620 A1 | 7/2005 | Kirkland et al. |
| 2005/0159970 A1 | 7/2005 | Buyukkokten et al. |
| 2005/0164704 A1 | 7/2005 | Winsor |
| 2005/0165584 A1 | 7/2005 | Boody et al. |
| 2005/0165893 A1 | 7/2005 | Feinberg et al. |
| 2005/0172234 A1 | 8/2005 | Chuchla |
| 2005/0188028 A1 | 8/2005 | Brown, Jr. et al. |
| 2005/0198159 A1 | 9/2005 | Kirsch |
| 2005/0198299 A1 | 9/2005 | Beck et al. |

(56) References Cited

U.S. PATENT DOCUMENTS

| | | |
|---|---|---|
| 2005/0198305 A1 | 9/2005 | Pezaris et al. |
| 2005/0203929 A1 | 9/2005 | Hazarika et al. |
| 2005/0204009 A1 | 9/2005 | Hazarika et al. |
| 2005/0213511 A1 | 9/2005 | Reece, Jr. et al. |
| 2005/0216300 A1 | 9/2005 | Appelman et al. |
| 2005/0222890 A1 | 10/2005 | Cheng et al. |
| 2005/0228881 A1 | 10/2005 | Reasor et al. |
| 2005/0228899 A1 | 10/2005 | Wendkos et al. |
| 2005/0235224 A1 | 10/2005 | Arend et al. |
| 2005/0278317 A1 | 12/2005 | Gross et al. |
| 2005/0278321 A1 | 12/2005 | Vailaya et al. |
| 2006/0004713 A1 | 1/2006 | Korte et al. |
| 2006/0004892 A1 | 1/2006 | Lunt et al. |
| 2006/0004914 A1 | 1/2006 | Kelly et al. |
| 2006/0015533 A1 | 1/2006 | Wolf et al. |
| 2006/0020398 A1 | 1/2006 | Vernon et al. |
| 2006/0031340 A1 | 2/2006 | Mathew et al. |
| 2006/0031775 A1 | 2/2006 | Sattler et al. |
| 2006/0047747 A1 | 3/2006 | Erickson et al. |
| 2006/0053199 A1 | 3/2006 | Pricken et al. |
| 2006/0056015 A1 | 3/2006 | Nishiyama |
| 2006/0059151 A1 | 3/2006 | Martinez et al. |
| 2006/0059238 A1 | 3/2006 | Slater et al. |
| 2006/0064431 A1 | 3/2006 | Kishore et al. |
| 2006/0064434 A1 | 3/2006 | Gilbert et al. |
| 2006/0065733 A1 | 3/2006 | Lee et al. |
| 2006/0074932 A1 | 4/2006 | Fong et al. |
| 2006/0075046 A1 | 4/2006 | Yozell-Epstein et al. |
| 2006/0083357 A1 | 4/2006 | Howell et al. |
| 2006/0083358 A1 | 4/2006 | Fong et al. |
| 2006/0085752 A1 | 4/2006 | Beadle et al. |
| 2006/0095331 A1 | 5/2006 | O'Malley et al. |
| 2006/0095502 A1 | 5/2006 | Lewis et al. |
| 2006/0101285 A1 | 5/2006 | Chen et al. |
| 2006/0101350 A1 | 5/2006 | Scott |
| 2006/0106793 A1 | 5/2006 | Liang |
| 2006/0123357 A1 | 6/2006 | Okamura |
| 2006/0136494 A1 | 6/2006 | Oh |
| 2006/0168073 A1 | 7/2006 | Kogan et al. |
| 2006/0173824 A1 | 8/2006 | Bensky et al. |
| 2006/0173961 A1 | 8/2006 | Turski et al. |
| 2006/0179415 A1 | 8/2006 | Cadiz et al. |
| 2006/0195361 A1 | 8/2006 | Rosenberg |
| 2006/0195474 A1 | 8/2006 | Cadiz et al. |
| 2006/0195785 A1 | 8/2006 | Portnoy et al. |
| 2006/0217116 A1 | 9/2006 | Cassett et al. |
| 2006/0218111 A1 | 9/2006 | Cohen |
| 2006/0224675 A1 | 10/2006 | Fox et al. |
| 2006/0242536 A1 | 10/2006 | Yokokawa et al. |
| 2006/0242609 A1 | 10/2006 | Potter et al. |
| 2006/0248151 A1 | 11/2006 | Belakovskiy et al. |
| 2006/0256008 A1 | 11/2006 | Rosenberg |
| 2006/0265460 A1 | 11/2006 | Kiyohara |
| 2006/0271630 A1 | 11/2006 | Bensky et al. |
| 2006/0281447 A1 | 12/2006 | Lewis et al. |
| 2006/0282303 A1 | 12/2006 | Hale et al. |
| 2007/0005702 A1 | 1/2007 | Tokuda et al. |
| 2007/0005715 A1 | 1/2007 | LeVasseur et al. |
| 2007/0005750 A1 | 1/2007 | Lunt et al. |
| 2007/0011367 A1 | 1/2007 | Scott et al. |
| 2007/0016647 A1 | 1/2007 | Gupta et al. |
| 2007/0022447 A1 | 1/2007 | Arseneau et al. |
| 2007/0038720 A1 | 2/2007 | Reding et al. |
| 2007/0050455 A1 | 3/2007 | Yach et al. |
| 2007/0060328 A1 | 3/2007 | Zrike et al. |
| 2007/0071187 A1 | 3/2007 | Apreutesei et al. |
| 2007/0073652 A1 | 3/2007 | Taboada et al. |
| 2007/0078884 A1 | 4/2007 | Ott, IV et al. |
| 2007/0083651 A1 | 4/2007 | Ishida |
| 2007/0088687 A1 | 4/2007 | Bromm et al. |
| 2007/0106780 A1 | 5/2007 | Farnham et al. |
| 2007/0112761 A1 | 5/2007 | Xu et al. |
| 2007/0115991 A1 | 5/2007 | Ramani et al. |
| 2007/0118533 A1 | 5/2007 | Ramer et al. |
| 2007/0123222 A1 | 5/2007 | Cox et al. |
| 2007/0124432 A1 | 5/2007 | Holtzman et al. |
| 2007/0129977 A1 | 6/2007 | Forney |
| 2007/0130527 A1 | 6/2007 | Kim |
| 2007/0135110 A1 | 6/2007 | Athale et al. |
| 2007/0143414 A1 | 6/2007 | Daigle |
| 2007/0153989 A1 | 7/2007 | Howell et al. |
| 2007/0156732 A1 | 7/2007 | Surendran et al. |
| 2007/0162432 A1* | 7/2007 | Armstrong ........... G06Q 10/107 |
| 2007/0174304 A1 | 7/2007 | Shrufi et al. |
| 2007/0174432 A1 | 7/2007 | Rhee et al. |
| 2007/0177717 A1 | 8/2007 | Owens et al. |
| 2007/0185844 A1 | 8/2007 | Schachter |
| 2007/0192490 A1 | 8/2007 | Minhas |
| 2007/0198500 A1 | 8/2007 | Lucovsky et al. |
| 2007/0203991 A1 | 8/2007 | Fisher et al. |
| 2007/0208802 A1 | 9/2007 | Barman et al. |
| 2007/0214141 A1 | 9/2007 | Sittig et al. |
| 2007/0218900 A1 | 9/2007 | Abhyanker |
| 2007/0244881 A1 | 10/2007 | Cha et al. |
| 2007/0244977 A1 | 10/2007 | Atkins |
| 2007/0250585 A1 | 10/2007 | Ly et al. |
| 2007/0255794 A1 | 11/2007 | Coutts |
| 2007/0271527 A1 | 11/2007 | Paas et al. |
| 2007/0273517 A1 | 11/2007 | Govind |
| 2007/0282956 A1 | 12/2007 | Staats |
| 2007/0288578 A1 | 12/2007 | Pantalone |
| 2007/0294281 A1 | 12/2007 | Ward et al. |
| 2007/0294428 A1 | 12/2007 | Guy et al. |
| 2008/0005247 A9 | 1/2008 | Khoo |
| 2008/0005249 A1 | 1/2008 | Hart |
| 2008/0010460 A1 | 1/2008 | Schuschan |
| 2008/0031241 A1 | 2/2008 | Toebes et al. |
| 2008/0037721 A1 | 2/2008 | Yao et al. |
| 2008/0040370 A1 | 2/2008 | Bosworth et al. |
| 2008/0040435 A1 | 2/2008 | Buschi et al. |
| 2008/0040474 A1 | 2/2008 | Zuckerberg et al. |
| 2008/0040475 A1 | 2/2008 | Bosworth et al. |
| 2008/0055263 A1 | 3/2008 | Lemay et al. |
| 2008/0056269 A1 | 3/2008 | Madhani et al. |
| 2008/0059428 A1 | 3/2008 | Kinder |
| 2008/0065701 A1 | 3/2008 | Lindstrom et al. |
| 2008/0071872 A1 | 3/2008 | Gross |
| 2008/0077614 A1 | 3/2008 | Roy |
| 2008/0104052 A1 | 5/2008 | Ryan et al. |
| 2008/0113674 A1 | 5/2008 | Baig |
| 2008/0114758 A1 | 5/2008 | Rupp et al. |
| 2008/0119201 A1 | 5/2008 | Kolber et al. |
| 2008/0120411 A1 | 5/2008 | Eberle |
| 2008/0122796 A1 | 5/2008 | Jobs et al. |
| 2008/0134081 A1 | 6/2008 | Jeon et al. |
| 2008/0147639 A1 | 6/2008 | Hartman et al. |
| 2008/0147810 A1 | 6/2008 | Kumar et al. |
| 2008/0162347 A1 | 7/2008 | Wagner |
| 2008/0162649 A1 | 7/2008 | Lee et al. |
| 2008/0162651 A1 | 7/2008 | Madnani |
| 2008/0163164 A1 | 7/2008 | Chowdhary et al. |
| 2008/0170158 A1 | 7/2008 | Jung et al. |
| 2008/0172362 A1 | 7/2008 | Shacham et al. |
| 2008/0172464 A1 | 7/2008 | Thattai et al. |
| 2008/0183832 A1 | 7/2008 | Kirkland et al. |
| 2008/0189122 A1 | 8/2008 | Coletrane et al. |
| 2008/0201304 A1 | 8/2008 | Sue |
| 2008/0208812 A1 | 8/2008 | Quoc et al. |
| 2008/0216092 A1 | 9/2008 | Serlet |
| 2008/0220752 A1 | 9/2008 | Forstall et al. |
| 2008/0222279 A1 | 9/2008 | Cioffi et al. |
| 2008/0222546 A1 | 9/2008 | Mudd et al. |
| 2008/0235353 A1 | 9/2008 | Cheever et al. |
| 2008/0242277 A1 | 10/2008 | Chen et al. |
| 2008/0270038 A1 | 10/2008 | Partovi et al. |
| 2008/0270939 A1 | 10/2008 | Mueller |
| 2008/0275748 A1 | 11/2008 | John |
| 2008/0275865 A1 | 11/2008 | Kretz et al. |
| 2008/0290987 A1 | 11/2008 | Li |
| 2008/0293403 A1 | 11/2008 | Quon et al. |
| 2008/0301166 A1 | 12/2008 | Sugiyama et al. |
| 2008/0301175 A1 | 12/2008 | Applebaum et al. |
| 2008/0301245 A1 | 12/2008 | Estrada et al. |
| 2008/0307066 A1 | 12/2008 | Amidon et al. |

(56) References Cited

U.S. PATENT DOCUMENTS

| | | |
|---|---|---|
| 2008/0313650 A1 | 12/2008 | Arnquist et al. |
| 2008/0319943 A1 | 12/2008 | Fischer |
| 2009/0005076 A1 | 1/2009 | Forstall et al. |
| 2009/0006366 A1 | 1/2009 | Johnson et al. |
| 2009/0010353 A1 | 1/2009 | She et al. |
| 2009/0012806 A1* | 1/2009 | Ricordi ............... G06F 16/27 705/16 |
| 2009/0029674 A1* | 1/2009 | Brezina ............ G06F 16/24575 455/405 |
| 2009/0030773 A1 | 1/2009 | Kamhoot |
| 2009/0030872 A1 | 1/2009 | Brezina et al. |
| 2009/0030919 A1 | 1/2009 | Brezina et al. |
| 2009/0030927 A1 | 1/2009 | Cases et al. |
| 2009/0030933 A1 | 1/2009 | Brezina et al. |
| 2009/0030940 A1 | 1/2009 | Brezina et al. |
| 2009/0031232 A1 | 1/2009 | Brezina et al. |
| 2009/0031244 A1 | 1/2009 | Brezina et al. |
| 2009/0031245 A1 | 1/2009 | Brezina et al. |
| 2009/0037541 A1 | 2/2009 | Wilson |
| 2009/0041224 A1 | 2/2009 | Bychkov et al. |
| 2009/0048994 A1 | 2/2009 | Applebaum et al. |
| 2009/0054091 A1 | 2/2009 | van Wijk et al. |
| 2009/0070412 A1 | 3/2009 | D'Angelo et al. |
| 2009/0076795 A1 | 3/2009 | Bangalore et al. |
| 2009/0077026 A1 | 3/2009 | Yanagihara |
| 2009/0082038 A1 | 3/2009 | McKiou et al. |
| 2009/0083278 A1 | 3/2009 | Zhao et al. |
| 2009/0100384 A1 | 4/2009 | Louch |
| 2009/0106415 A1 | 4/2009 | Brezina et al. |
| 2009/0106676 A1 | 4/2009 | Brezina et al. |
| 2009/0111495 A1 | 4/2009 | Sjolin et al. |
| 2009/0119678 A1 | 5/2009 | Shih et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0138546 A1 | 5/2009 | Cruzada |
| 2009/0150251 A1 | 6/2009 | Zhitomirsky |
| 2009/0156170 A1 | 6/2009 | Rossano et al. |
| 2009/0157717 A1 | 6/2009 | Palahnuk et al. |
| 2009/0171930 A1 | 7/2009 | Vaughan et al. |
| 2009/0171979 A1* | 7/2009 | Lubarski ............... G06Q 10/10 |
| 2009/0174680 A1 | 7/2009 | Anzures et al. |
| 2009/0177754 A1 | 7/2009 | Brezina et al. |
| 2009/0182788 A1 | 7/2009 | Chung et al. |
| 2009/0187991 A1 | 7/2009 | Freericks et al. |
| 2009/0191899 A1 | 7/2009 | Wilson et al. |
| 2009/0198688 A1 | 8/2009 | Venkataraman et al. |
| 2009/0209286 A1* | 8/2009 | Bentley ............... H04L 51/32 455/556.1 |
| 2009/0213088 A1 | 8/2009 | Hardy et al. |
| 2009/0216847 A1 | 8/2009 | Krishnaswamy et al. |
| 2009/0217178 A1 | 8/2009 | Niyogi et al. |
| 2009/0228555 A1 | 9/2009 | Joviak et al. |
| 2009/0234815 A1 | 9/2009 | Boerries et al. |
| 2009/0234925 A1 | 9/2009 | Seippel, III et al. |
| 2009/0248415 A1 | 10/2009 | Jablokov et al. |
| 2009/0249198 A1 | 10/2009 | Davis et al. |
| 2009/0271370 A1 | 10/2009 | Jagadish et al. |
| 2009/0271409 A1 | 10/2009 | Ghosh |
| 2009/0299824 A1 | 12/2009 | Barnes, Jr. |
| 2009/0300127 A1 | 12/2009 | Du |
| 2009/0300546 A1 | 12/2009 | Kwok et al. |
| 2009/0300596 A1 | 12/2009 | Tyhurst et al. |
| 2009/0306981 A1 | 12/2009 | Cromack et al. |
| 2009/0313573 A1 | 12/2009 | Paek et al. |
| 2009/0319329 A1 | 12/2009 | Aggarwal et al. |
| 2009/0327226 A1 | 12/2009 | Brito et al. |
| 2009/0328161 A1 | 12/2009 | Puthenkulam et al. |
| 2010/0009332 A1 | 1/2010 | Yaskin et al. |
| 2010/0015954 A1 | 1/2010 | Yang |
| 2010/0030715 A1 | 2/2010 | Eustice et al. |
| 2010/0036833 A1 | 2/2010 | Yeung et al. |
| 2010/0049534 A1 | 2/2010 | Whitnah et al. |
| 2010/0057858 A1 | 3/2010 | Shen et al. |
| 2010/0057859 A1 | 3/2010 | Shen et al. |
| 2010/0062753 A1 | 3/2010 | Wen et al. |
| 2010/0070875 A1* | 3/2010 | Turski ............... G06Q 10/107 715/748 |
| 2010/0077041 A1 | 3/2010 | Cowan et al. |
| 2010/0082693 A1 | 4/2010 | Hugg et al. |
| 2010/0083182 A1 | 4/2010 | Liu et al. |
| 2010/0088340 A1 | 4/2010 | Muller et al. |
| 2010/0094869 A1 | 4/2010 | Ebanks |
| 2010/0094911 A1 | 4/2010 | Bird |
| 2010/0100899 A1 | 4/2010 | Bradbury et al. |
| 2010/0121831 A1 | 5/2010 | Lin et al. |
| 2010/0131447 A1 | 5/2010 | Creutz et al. |
| 2010/0153832 A1 | 6/2010 | Markus et al. |
| 2010/0158214 A1 | 6/2010 | Gravino et al. |
| 2010/0161547 A1 | 6/2010 | Carmel et al. |
| 2010/0161729 A1 | 6/2010 | Leblanc et al. |
| 2010/0162171 A1 | 6/2010 | Felt et al. |
| 2010/0164957 A1 | 7/2010 | Lindsay et al. |
| 2010/0167700 A1 | 7/2010 | Brock et al. |
| 2010/0169327 A1 | 7/2010 | Lindsay et al. |
| 2010/0174784 A1 | 7/2010 | Levey et al. |
| 2010/0185610 A1 | 7/2010 | Lunt et al. |
| 2010/0191844 A1 | 7/2010 | He et al. |
| 2010/0216509 A1 | 8/2010 | Riemer et al. |
| 2010/0228560 A1 | 9/2010 | Balasaygun et al. |
| 2010/0229096 A1 | 9/2010 | Maiocco et al. |
| 2010/0229157 A1 | 9/2010 | Ergan et al. |
| 2010/0229223 A1 | 9/2010 | Shepard et al. |
| 2010/0235375 A1 | 9/2010 | Sidhu et al. |
| 2010/0241579 A1 | 9/2010 | Bassett et al. |
| 2010/0250682 A1 | 9/2010 | Goldberg et al. |
| 2010/0275128 A1 | 10/2010 | Ward et al. |
| 2010/0281535 A1 | 11/2010 | Perry, Jr. et al. |
| 2010/0306185 A1 | 12/2010 | Smith et al. |
| 2010/0312837 A1 | 12/2010 | Bodapati et al. |
| 2010/0318614 A1* | 12/2010 | Sager ............... G06Q 10/107 709/206 |
| 2010/0330972 A1 | 12/2010 | Angiolillo |
| 2011/0010423 A1 | 1/2011 | Thatcher et al. |
| 2011/0035451 A1 | 2/2011 | Smith et al. |
| 2011/0040726 A1 | 2/2011 | Crosbie et al. |
| 2011/0072052 A1 | 3/2011 | Skarin et al. |
| 2011/0078259 A1* | 3/2011 | Rashad ............... G06Q 10/107 709/206 |
| 2011/0086627 A1 | 4/2011 | Khosravi |
| 2011/0087969 A1 | 4/2011 | Hein et al. |
| 2011/0123005 A1 | 5/2011 | Segall et al. |
| 2011/0145192 A1 | 6/2011 | Quintela et al. |
| 2011/0145219 A1 | 6/2011 | Cierniak et al. |
| 2011/0173274 A1 | 7/2011 | Sood |
| 2011/0173547 A1 | 7/2011 | Lewis et al. |
| 2011/0191337 A1 | 8/2011 | Cort et al. |
| 2011/0191340 A1 | 8/2011 | Cort et al. |
| 2011/0191717 A1 | 8/2011 | Cort et al. |
| 2011/0191768 A1 | 8/2011 | Smith |
| 2011/0196802 A1 | 8/2011 | Ellis et al. |
| 2011/0201275 A1 | 8/2011 | Jabara et al. |
| 2011/0202532 A1 | 8/2011 | Nakazawa et al. |
| 2011/0219317 A1 | 9/2011 | Thatcher et al. |
| 2011/0225293 A1 | 9/2011 | Rathod |
| 2011/0231396 A1 | 9/2011 | Dhara et al. |
| 2011/0231407 A1 | 9/2011 | Gupta et al. |
| 2011/0231499 A1 | 9/2011 | Stovicek et al. |
| 2011/0235790 A1* | 9/2011 | Strope ............... H04L 51/32 379/93.02 |
| 2011/0252383 A1 | 10/2011 | Miyashita |
| 2011/0276396 A1 | 11/2011 | Rathod |
| 2011/0282905 A1 | 11/2011 | Polis et al. |
| 2011/0291860 A1 | 12/2011 | Ozaki et al. |
| 2011/0291933 A1 | 12/2011 | Holzer et al. |
| 2011/0295988 A1* | 12/2011 | Le Jouan ............... G06F 21/31 709/223 |
| 2011/0298701 A1 | 12/2011 | Holzer et al. |
| 2011/0302123 A1 | 12/2011 | Nista et al. |
| 2011/0302509 A1 | 12/2011 | Leacock et al. |
| 2012/0011204 A1 | 1/2012 | Morin et al. |
| 2012/0017158 A1 | 1/2012 | Maguire et al. |
| 2012/0036254 A1 | 2/2012 | Onuma |

(56) References Cited

U.S. PATENT DOCUMENTS

| | | | |
|---|---|---|---|
| 2012/0041907 A1 | 2/2012 | Wang et al. | |
| 2012/0054681 A1 | 3/2012 | Cort et al. | |
| 2012/0079023 A1* | 3/2012 | Tejada-Gamero | G06Q 50/01 |
| | | | 709/204 |
| 2012/0084461 A1 | 4/2012 | Athias et al. | |
| 2012/0089678 A1 | 4/2012 | Cort et al. | |
| 2012/0089690 A1 | 4/2012 | Hein et al. | |
| 2012/0110080 A1 | 5/2012 | Panyam et al. | |
| 2012/0110096 A1* | 5/2012 | Smarr | H04W 4/21 |
| | | | 709/206 |
| 2012/0150970 A1 | 6/2012 | Peterson et al. | |
| 2012/0150978 A1 | 6/2012 | Monaco et al. | |
| 2012/0150979 A1 | 6/2012 | Monaco | |
| 2012/0166999 A1 | 6/2012 | Thatcher et al. | |
| 2012/0197871 A1 | 8/2012 | Mandel et al. | |
| 2012/0198348 A1* | 8/2012 | Park | G06F 3/0488 |
| | | | 715/739 |
| 2012/0246065 A1 | 9/2012 | Yarvis et al. | |
| 2012/0259834 A1 | 10/2012 | Broder et al. | |
| 2012/0271822 A1 | 10/2012 | Schwendimann et al. | |
| 2012/0278428 A1 | 11/2012 | Harrison et al. | |
| 2012/0330658 A1 | 12/2012 | Bonforte | |
| 2012/0330980 A1 | 12/2012 | Rubin et al. | |
| 2012/0331418 A1 | 12/2012 | Bonforte | |
| 2013/0007627 A1 | 1/2013 | Monaco | |
| 2013/0014021 A1 | 1/2013 | Bau et al. | |
| 2013/0080915 A1 | 3/2013 | Lewis et al. | |
| 2013/0091288 A1 | 4/2013 | Shalunov et al. | |
| 2013/0120444 A1 | 5/2013 | Allyn et al. | |
| 2013/0173712 A1 | 7/2013 | Monjas Llorente et al. | |
| 2013/0246931 A1* | 9/2013 | Harris | H04L 67/10 |
| | | | 715/739 |
| 2013/0260795 A1 | 10/2013 | Papakipos et al. | |
| 2014/0011481 A1 | 1/2014 | Kho | |
| 2014/0081914 A1 | 3/2014 | Smith et al. | |
| 2014/0081964 A1 | 3/2014 | Rubin et al. | |
| 2014/0087687 A1 | 3/2014 | Brezina et al. | |
| 2014/0089304 A1 | 3/2014 | Rubin et al. | |
| 2014/0089411 A1 | 3/2014 | Rubin et al. | |
| 2014/0095433 A1 | 4/2014 | Cort et al. | |
| 2014/0100861 A1 | 4/2014 | Ledet | |
| 2014/0115086 A1 | 4/2014 | Chebiyyam | |
| 2014/0156650 A1 | 6/2014 | Jacobson | |
| 2014/0207761 A1 | 7/2014 | Brezina et al. | |
| 2014/0214981 A1 | 7/2014 | Mallet et al. | |
| 2014/0280094 A1 | 9/2014 | Brandstetter | |
| 2014/0280097 A1 | 9/2014 | Lee et al. | |
| 2014/0287786 A1 | 9/2014 | Bayraktar et al. | |
| 2015/0074213 A1 | 3/2015 | Monaco | |
| 2015/0170650 A1 | 6/2015 | Bonforte | |
| 2015/0222719 A1 | 8/2015 | Hein et al. | |
| 2016/0070787 A1 | 3/2016 | Brezina et al. | |
| 2016/0147899 A1 | 5/2016 | Smith et al. | |
| 2016/0182661 A1 | 6/2016 | Brezina et al. | |
| 2017/0147699 A1 | 5/2017 | Rubin et al. | |
| 2017/0171124 A1 | 6/2017 | Brezina et al. | |
| 2017/0187663 A1 | 6/2017 | Brezina et al. | |
| 2017/0287483 A1 | 10/2017 | Bonforte | |
| 2017/0302749 A1 | 10/2017 | Brezina et al. | |
| 2017/0324821 A1 | 11/2017 | Brezina et al. | |
| 2017/0337514 A1 | 11/2017 | Cort et al. | |
| 2017/0372265 A1 | 12/2017 | Quintela et al. | |
| 2018/0095970 A1 | 4/2018 | Cort et al. | |
| 2018/0234513 A1 | 8/2018 | Brezina et al. | |

FOREIGN PATENT DOCUMENTS

| | | |
|---|---|---|
| JP | 2003006116 | 1/2003 |
| JP | 2007249307 | 9/2007 |
| KR | 20060056015 | 5/2006 |
| KR | 1020090068819 | 6/2009 |
| KR | 1020090112257 | 10/2009 |
| KR | 1020090115239 | 11/2009 |
| KR | 1020020060386 | 8/2012 |
| WO | 2003098515 | 11/2003 |
| WO | 2007037875 | 4/2007 |
| WO | 2007143232 | 12/2007 |
| WO | 2012082886 | 6/2012 |
| WO | 2012082929 | 6/2012 |

OTHER PUBLICATIONS

"OpenSocial Specification v0.9", OpenSocial and Gadgets Specification Group, Apr. 2009.

"The Ultimate Guide for Everything Twitter", Webdesigner Depot, archive.org copy of webpage https://web.archive.org/web/200903250421 15/http://www.webdesignerdepot.com/2009/03/the-ultimate-guide-for-everything- twitter/ from Mar. 25, 2009.

Android-Tips.com, "Android Tips & Tricks: How to Import Contacts into Android Phone," located at http://android-tips.com/how-to-import-contacts-into-android/, Nov. 17, 2008 (document provided includes third-party comments submitted under the USPTO PeerToPatent program).

Bernstein, Michael S. et al., "Enhancing Directed Content Sharing on the Web," Proceedings of the 28th International Conference on Human Factors in Computing Systems, Atlanta, GA, Apr. 10-15, 2010, pp. 971-980.

Carvalho, Vitor R. et al., "Ranking Users for Intelligent Message Addressing," Proceedings of the 30th European Conference on Information Retrieval, Glasgow, England, Mar. 30-Apr. 3, 2008, pp. 321-333.

Culotta, Aron et al., "Extracting Social Networks and Contact Information from Email and the Web," Proceedings of the First Conference on Email and Anti-Spam (CEAS), Mountain View, CA, Jul. 30-31, 2004 (document provided includes third-party comments submitted under the USPTO PeerToPatent program).

Elsayed, Tamer et al., "Personal Name Resolution in Email: A Heuristic Approach," University of Maryland Technical Report No. TR-LAMP-150, Mar. 17, 2008.

Epstein, "Harnessing User Data to Improve Facebook Features", Doctoral dissertation, Boston College, May 12, 2010.

European Patent Application No. 11849271.9, Extended Search Report, dated Apr. 3, 2014.

European Patent Application No. 12801970.0, Extended Search Report, dated Oct. 23, 2014.

European Patent Application 12801998.1, Extended Search Report, dated Feb. 10, 2015.

European Patent Application No. 10797483.4, extended European Search Report, dated Dec. 20, 2016.

Extended European Search Report, EP 10 78 3783, dated Mar. 24, 2014.

Fitzpatrick, Brad, "AddressBooker," Github Social Coding, located at http://addressbooker.appspot.com/, Nov. 28, 2008 (document provided includes third-party comments submitted under the USPTO PeerToPatent program).

Google Inc. "OpenSocial Tutorial," located at http://code.google.com/apis/opensocial/articles/tutorial/tutorial-08.html, Aug. 2008.

Google Inc., "Automatic Updating of Contacts," Gmail help forum, located at http://74.125.4.16/support/forum/p/gmail/thread?tid=03f7b692150d9242&hl=en, Apr. 27, 2009 (document provided includes third-party comments submitted under the USPTO PeerToPatent program).

Hillebrand, Tim, "Plaxo: The Smart Auto Update Address Book," Smart Phone Mag, located at http://www.smartphonemag.com/cms/blogs/9/plaxo_the_smart_auto_update_address_book, Nov. 6, 2006 (document provided includes third-party comments submitted under the USPTO PeerToPatent program).

Hannon et al., "Recommending Twitter Users to Follow Using Content and Collaborative Filtering Approaches", RecSys2010, Sep. 26-30, 2010, Barcelona, Spain.

International Patent Application PCT/US10/34782, International Search Report and Written Opinion, dated Dec. 22, 2010.

International Patent Application PCT/US10/35405, International Search Report and Written Opinion, dated Jan. 3, 2011.

International Patent Application PCT/US10/52081, International Search Report and Written Opinion, dated May 20, 2011.

(56) References Cited

OTHER PUBLICATIONS

International Patent Application PCT/US10/56560, International Search Report and Written Opinion, dated Jun. 21, 2011.
International Patent Application PCT/US11/64958, International Search Report and Written Opinion, dated Jul. 31, 2012.
International Patent Application PCT/US12/043523, International Search Report and Written Opinion, dated Nov. 28, 2012.
International Patent Application PCT/US2011/064892, International Search Report and Written Opinion, dated Aug. 22, 2012.
International Patent Application PCT/US2012/043507, International Search Report and Written Opinion, dated Jan. 3, 2013.
Microsoft Corporation, "About AutoComplete Name Suggesting," Microsoft Outlook 2003 help forum, located at http://office.microsoft.com/en-us/outlook/HP063766471033.aspx, 2003.
Oberhaus, Kristin, "Look for Cues: Targeting Without Personally Identifiable Information," W3i, LLC blog entry located at http://blog.w3i.com/2009/09/03/looking-for-cues-targeting-without-personally-identifiable-information/, Sep. 3, 2009.
OpenSocial Foundation, "Social Application Tutorial (v0.9)," located at http://wiki.opensocial.org/index.php?title=Social_Application_Tutorial, accessed Oct. 8, 2010.
PCWorld Communications, Inc., "Your Contacts Are Forever: Self-Updating Address Book," located at http://www.pcworld.com/article/48192/your_contacts_are_forever_selfupdating_address_book.html, May 1, 2001 (document provided includes third-party comments submitted under the USPTO PeerToPatent program).
U.S. Appl. No. 61/407,018, filed Oct. 27, 2010.
W3i, LLC, "Advertiser Feedback System (AFS)," company product description. Sep. 22, 2009.
Wikimedia Foundation, Inc., "Machine Learning," Wikipedia encyclopedia entry located at http://en.wikipedia.org/wiki/Machine_learning, Jan. 30, 2011.

* cited by examiner

PRESENTING ENTITY PROFILE INFORMATION TO A USER OF A COMPUTING DEVICE

CROSS-REFERENCE TO RELATED APPLICATIONS

This is a continuation application of U.S. Non-Provisional application Ser. No. 13/534,612, filed Jun. 27, 2012, entitled "PRESENTING ENTITY PROFILE INFORMATION TO A USER OF A COMPUTING DEVICE," by P. Monaco, which itself claims priority to U.S. Provisional Application Ser. No. 61/503,570, filed Jun. 30, 2011, entitled "Presenting Entity Profile Information to a User of a Computing Device," by P. Monaco, the entire contents of which applications are by reference as if fully set forth herein.

The present application is related to U.S. patent application Ser. No. 12/792,698, filed Jun. 2, 2010, entitled "SELF POPULATING ADDRESS BOOK," by Smith et al., which was also published as U.S. Patent Publication No. 2010/0306185 on Dec. 2, 2010, the entire contents of which applications are incorporated by reference as if fully set forth herein.

The present application is also related to U.S. Patent Application Ser. No. 61/423,052, filed Dec. 14, 2010, entitled "SENDER-BASED RANKING OF PERSON PROFILES AND MULTI-PERSON AUTOMATIC SUGGESTIONS," by P. Monaco, and also to U.S. Patent Publication No. 2012/0150979 published on Jun. 14, 2012, and having the same title and inventor as the foregoing provisional application, the entire contents of which applications are incorporated by reference as if fully set forth herein.

The present application is also related to Patent Publication No. US 2009/0031232, published Jan. 29, 2009, entitled "METHOD AND SYSTEM FOR DISPLAY OF INFORMATION IN A COMMUNICATION SYSTEM GATHERED FROM EXTERNAL SOURCES," by Brezina et al., the entire contents of which application are incorporated by reference as if fully set forth herein.

The present application is also related to Patent Publication No. US 2009/0031245, published Jan. 29, 2009, entitled "METHOD AND SYSTEM FOR COLLECTING AND PRESENTING HISTORICAL COMMUNICATION DATA," by Brezina et al., the entire contents of which application are incorporated by reference as if fully set forth herein.

The present application is also related to Patent Publication No. US 2009/0106676, published Apr. 23, 2009, entitled "APPLICATION PROGRAMMING INTERFACES FOR COMMUNICATION SYSTEMS," by Brezina et al., the entire contents of which application are incorporated by reference as if fully set forth herein.

FIELD OF THE TECHNOLOGY

At least some embodiments disclosed herein relate to data and information processing systems in general, and more particularly, but not limited to, creation and/or presentation of entity profile information to a user of a computing device.

BACKGROUND

Electronic communications for both business and personal use have increased substantially in recent years. In addition to the number of communications increasing, the number of available communication mediums has also increased. In addition to email communications and telephone communications, additional forms of communication have become common in recent years, including instant messaging, social network messaging and commenting, message board posting, text messaging, and Voice Over Internet Protocol communications.

Many of these electronic communications are sent from businesses to individuals. For example, a tracking number for a package being shipped by AMAZON.COM to a purchaser may be provided to the purchaser via an email, or a flight number and other information for an upcoming flight reserved by a customer on an AMERICAN AIRLINES website is sent to the customer by email.

Increasingly, businesses are sending a large number of emails to a customer or user, such as from various, different divisions of the business (e.g., shipping and customer service). Each of these emails is often sent by the business using different email addresses. For example, FACEBOOK often uses automatically-generated email addresses for each email message it sends to a user.

SUMMARY OF THE DESCRIPTION

Systems and methods for presentation (e.g., via a display) of entity profile information (e.g., information regarding a company, association, or other entity that is not an individual person) to a user of a computing device (e.g., a mobile device or tablet computer) are described herein. Some embodiments are summarized in this section.

In one embodiment, a method includes: receiving a communication associated with a first entity; in response to receiving the communication, creating or updating, by at least one processor, a first entity profile, wherein the first entity profile is for display to a user on a computing device of the user; and storing a plurality of entity profiles for entities, the entity profiles including the first entity profile. In various embodiments, the computing device may be a mobile device (e.g., an IPHONE or ANDROID device), a desktop computer, a laptop computer, or a tablet computer (e.g., an IPAD computing device).

In another embodiment, a method includes: receiving a first communication associated with a first entity; in response to receiving the first communication, creating, by a computing device of a user, a first entity profile; and presenting, on a display of the computing device, the first entity profile to the user.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
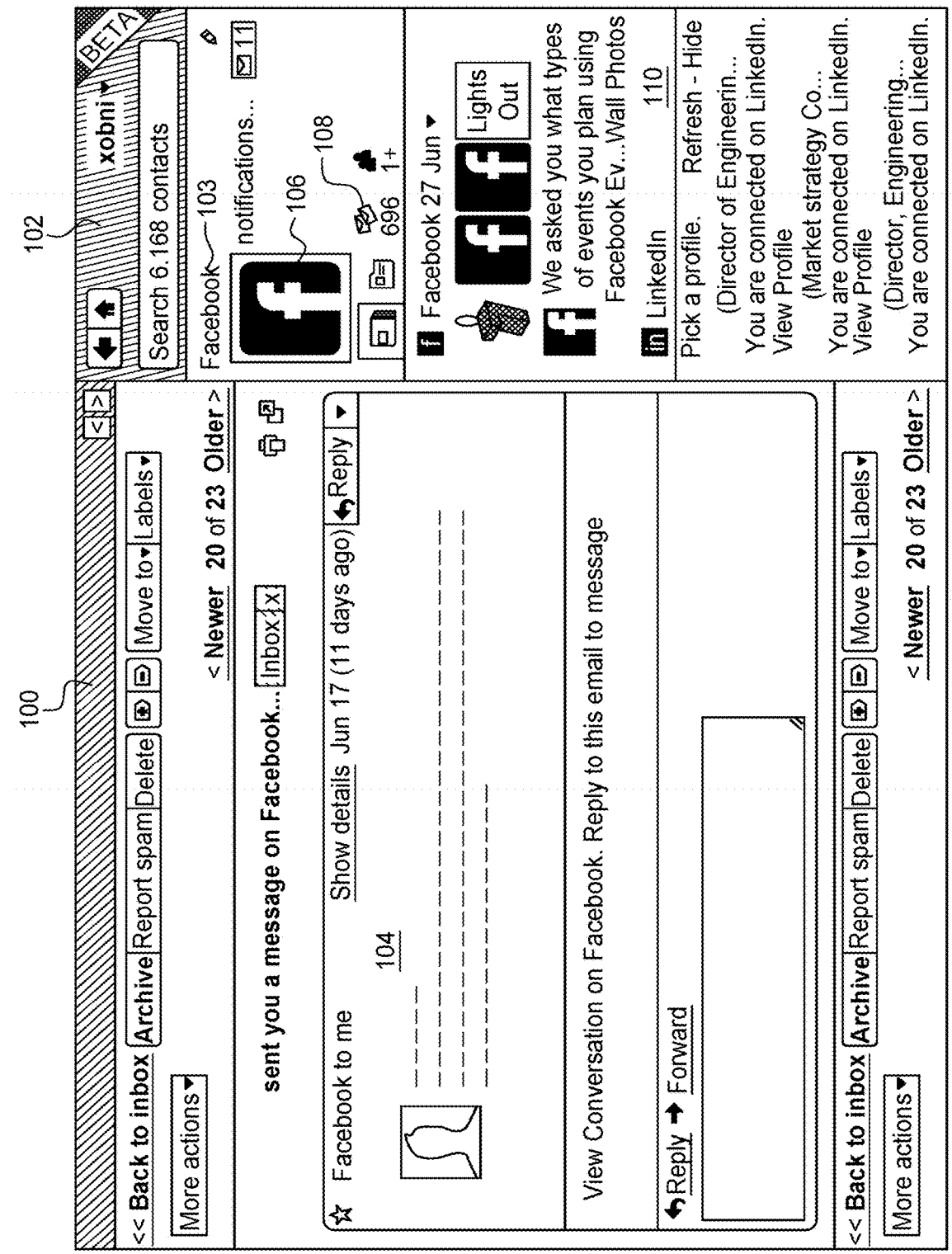
FIG. 1 shows a user interface presented on a display that includes an email received by the user and an entity profile sidebar, according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an electronic communication is received from an entity by a user of a mobile device, and in response to receiving the communication, an entity profile is created for the entity (e.g., this may be a first communication from the entity, and receipt of this communication is the trigger for creation of the entity profile). The entity profile may be stored, for example, on the mobile device and/or on a server or other computer with which the mobile device or user is associated, or with which the mobile device otherwise communicates.

In another embodiment, the entity profile is presented to the user as a sidebar, window, screen, or other form of visual presentation on a display of a mobile device. The sidebar may include a list of communication addresses (e.g., email addresses, text message addresses, or voice communication phone numbers) associated with the entity being profiled—this list may be displayed to the user in the sidebar. The sidebar may be presented within a user interface for an application (e.g., an email client interface) or may be presented separately.

In one embodiment, some of the information included in the entity profile and/or presented in the sidebar or other form of visual presentation is information that is extracted from the first, triggering communication from the entity and/or is extracted from subsequent communication(s) from the entity. For example, a tracking number sent in an email to a user from AMAZON.COM is presented in the sidebar as part of an entity profile for the entity AMAZON.COM.

In other embodiments, prior emails sent to the user from an entity are presented in the sidebar. These emails may be organized into various groups such as, for example, shipping, reservations, product information, company reports, etc.

In one embodiment, the communication addresses are associated with the entity being profiled (e.g., the associating may be performed by a server that is monitoring communications to or from the entity with other persons, such as other users of mobile devices that have received communications from the entity prior to the user receiving his or her first communication from the entity that triggers creation of the entity profile).

In one embodiment, the entity profile, along with other profiles, may be stored on a server associated with or otherwise accessible by a computing device (e.g., a mobile device) of a user. The server may store the data, for example, in a database in the form of entity profiles (e.g., these may be generic or default entity profiles awaiting downloading to and customization for a specific user having received a triggering email—other triggering events also may be used for prompting download or customization of the entity profile for the user).

Data collected for use in these entity profiles may be extracted from communications between the entity and the user of the mobile device (e.g., including the first communication that triggers creation of the entity profile). In another embodiment, communications sent by the user to the entity may provide some of the data for the entity profile. The data may be, for example, extracted by the server in the course of the transmission of the communications, the mobile device may send the data to the server, and/or other approaches may be used by the server to collect the data. Numerous examples of various types of data that may be collected in a database or otherwise for use in creating or updating entity profiles are described in U.S. patent application Ser. No. 12/792,698 and other of the patent applications and patent publications incorporated by reference above. In other embodiments, the mobile device itself may store some or all of the data for the entity profiles.

In another embodiment, a plurality of profile entities are created prior to a user receiving a first, triggering communication from the entity. Once a triggering communication is received by the computing device of the user, then the preexisting entity profile is created on the user's computing device, or created on a server or other computer providing an account or other services for the user. After creation for the user as just described, the preexisting entity profile may be customized for the user using previously collected information for the user (e.g., person profiles created from prior emails to the user), or using newly-collected or generated information associated with the user (e.g., based on a search on an Internet engine using the user's name and the entity name as search terms).

In other embodiments, a second or subsequent communication from the entity may be the trigger for creation of the entity profile on the user device. For example, it may be required that a predetermined number of emails be received from the entity prior to a profile being created on the user's computing device. In another example, the communication may be required to contain certain information (e.g., a keyword or number), contain a specific type or category of information, or be related to someone in a social network of the user (e.g., the email is sent to another person that is in the user's social network) in order to trigger creation of the entity profile or customization of a preexisting, default entity profile for the user.

FIG. 1 shows a user interface 100 presented on a display of a mobile device (e.g., an ANDROID phone or IPHONE mobile device) of a user, according to one embodiment. The interface 100 presents a window or other portion of interface 100 that shows an email 104 received by the user. An entity profile sidebar 102 is displayed to the side of this window.

When the user receives email 104 from an entity 103 (e.g., a corporation named in the upper portion of sidebar 102), sidebar 102 shows information about the entity 103. Sidebar 102 may also appear at various other times when the user is accessing interface 100, such as when doing a search for the entity. This information may include, for example, the company logo 106 or other icon associated with the company, the company's TWITTER and FACEBOOK pages 110, phone number, address, product information, etc. This may further include information about the user's relationship with the company (e.g., all, or a portion of, emails that have passed back and forth between the user and the company, which emails are accessible by the user via an interface tab 108; also, other information that is personal to this particular user's relationship or interaction with the entity may be presented). This information may have been collected as previously described above.

Figure 2:
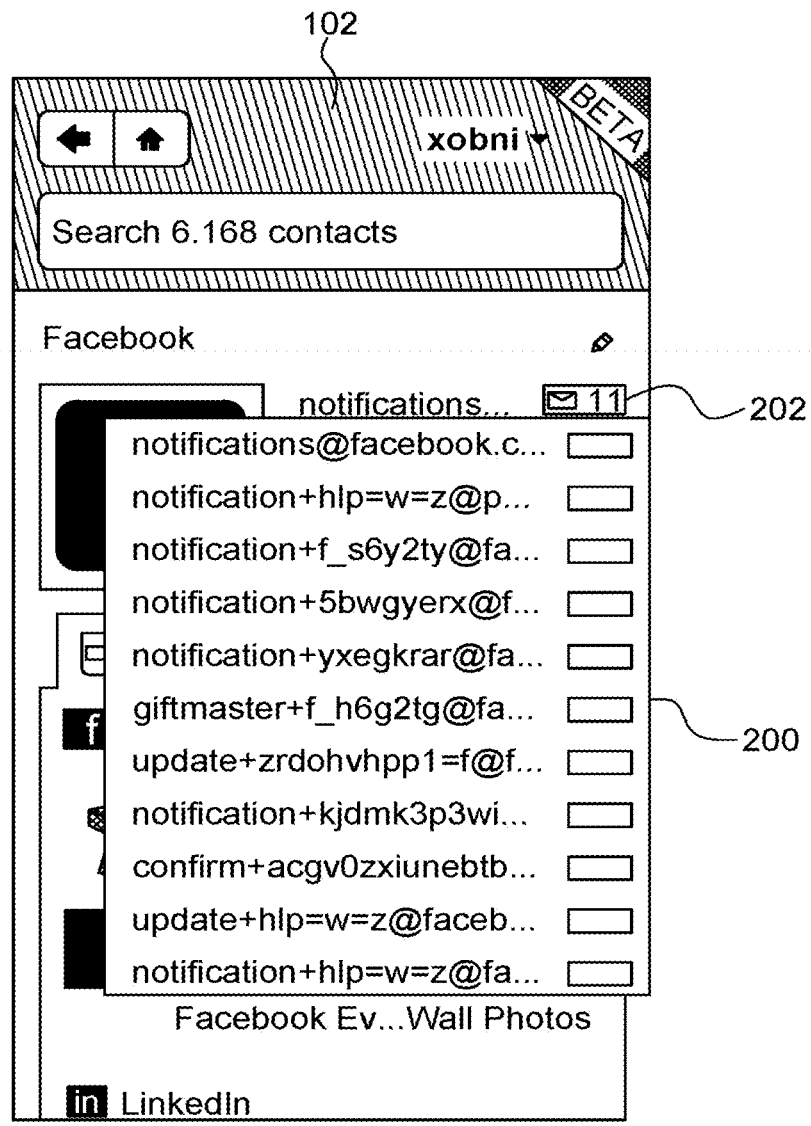
FIG. 2 shows a user screen that presents to a user those email addresses that have been associated with the entity corresponding to the entity profile of FIG. 1, according to one embodiment.

FIG. 2 shows a user screen 200 presenting to a user in sidebar 102 a plurality of email addresses associated with entity 103, according to one embodiment. These addresses may be accessed by the user by clicking on tab 202 found on sidebar 102. These associated email addresses may have been determined by analysis of prior communications to and/or from entity 103, and/or determined by other approaches. These prior communications may have been between other users that are different than the user of the mobile device displaying sidebar 102 (e.g., these may be other users that, along with the user, are associated with server(s) implementing email communications or inbox services or software provided by Xobni Corporation located in San Francisco, Calif., and which server(s) collect entity data including email addresses from some or all users as communications are sent to or received from various entities).

These associated email addresses have been identified as belonging to entity 103 (i.e., FACEBOOK in this embodiment). Companies like FACEBOOK often use automatically-generated email addresses for each email message sent to users of FACEBOOK. A server(s) or other computer (e.g., a Xobni server, or a server for an address book/contact service provider) identifies these patterns, and associates each one of these email addresses with a corresponding entity. In prior approaches, when a user is searching for a specific email that came from a company, the user often has difficulty finding the email (e.g., the user does not know the email address that the sending company has used). When all of the email or other communication addresses from a company are grouped under an entity profile (e.g., using a human-understandable "FACEBOOK" tag as illustrated in FIG. 1), the user is more readily able to search for the email or communication.

Figure 3:
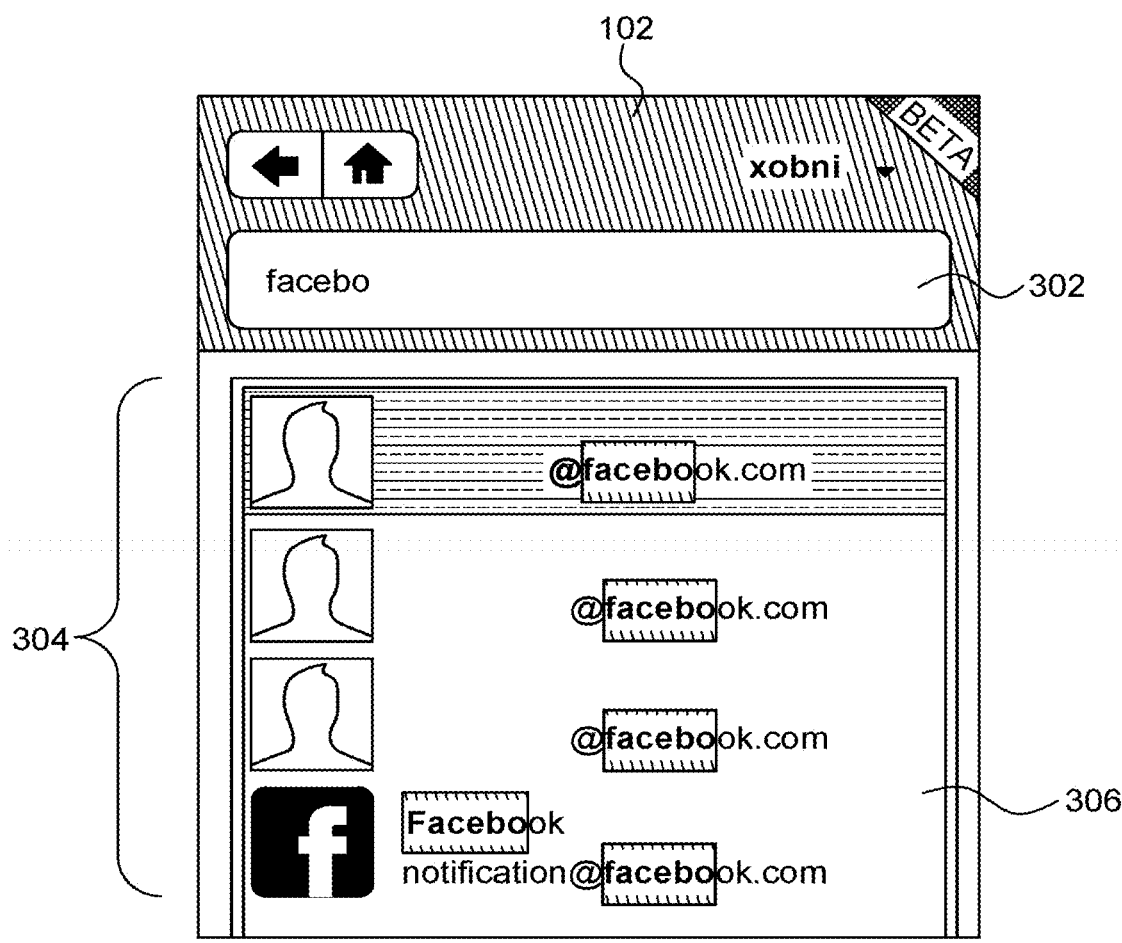
FIG. 3 shows a user input field in which a user has provided a partial input for search, and for which a list of matching contacts, including the entity profile, are displayed to the user, according to one embodiment.

FIG. 3 shows a user input field 302 of sidebar 102 in which the user has provided a partial input "facebo" in order to initiate a search of information on the mobile device and/or on a remote server (i.e., the user intends to search for FACEBOOK entity information), and for which a list of matching contacts 304, including the entity profile (i.e., profile for FACEBOOK), are displayed to the user, according to one embodiment. When the user searches for "facebo . . . ", all of the people that the user knows at FACEBOOK (e.g., as represented by personal profiles stored on the user's mobile device), as well as the entity profile 306 for FACEBOOK itself are displayed. The prominence of the FACEBOOK logo assists the user to identify the search result that refers to FACEBOOK the company (as opposed to individual persons associated with FACEBOOK).

Figure 4:
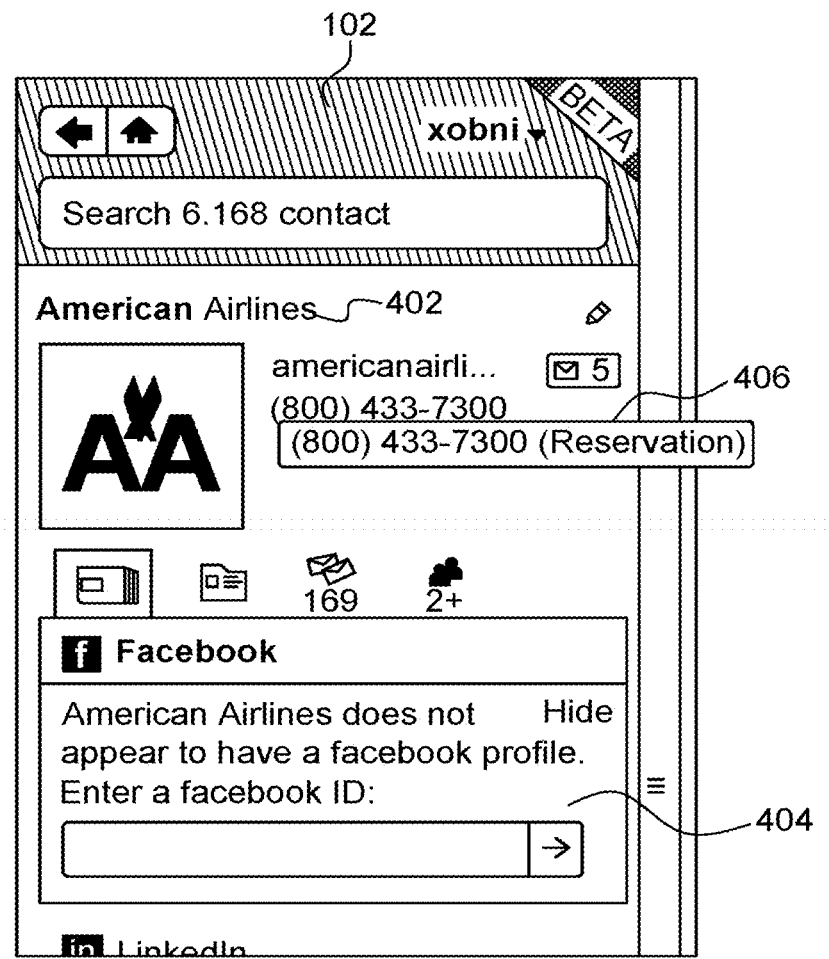
FIG. 4 shows the augmentation of an entity profile (e.g., an entity contact) with additional information associated with the entity that may be helpful for the user in performing a task such as creating or initiating a new communication (e.g., a phone call to a reservation department), according to one embodiment.

FIG. 4 shows the augmentation of an entity profile in sidebar 102 (e.g., an entity contact for AMERICAN AIRLINES) with additional information associated with the entity 402 that may be helpful for the user in performing a task such as creating or initiating a new communication (e.g., a phone call to a reservation department of AMERICAN AIRLINES), according to one embodiment. A social network page 404 of the entity is included in the entity profile and displayed as part of sidebar 102.

More specifically, the entity profile can be augmented with additional information that is useful to the user. In this embodiment, the user has only communicated with AMERICAN AIRLINES by email. However, these emails are identified and an entity profile is created specifically for this user (note that a preexisting entity profile for "AMERICAN AIRLINES" already exists and may be, for example, downloaded to the user's mobile device). The entity profile has a reservations phone number 406 inserted for AMERICAN AIRLINES. This makes it easier for the user to call AMERICAN AIRLINES if desired. In this embodiment, the entity profile is specifically installed, created, or customized for the user only in response to the user having a first, initial email conversation with AMERICAN AIRLINES. Once the entity profile is created for the user, the system may customize it by inserting other information not found in the user's email or other communications with AMERICAN AIRLINES.

In one embodiment, an entity profile is a preexisting profile or contact or data record, waiting for this user to receive an email from the specific entity corresponding to the preexisting profile. Once the user is observed to interact with that specific entity, the entity profile is created for the user's mobile device. The preexisting profile may include, for example, a company logo, a reservations phone number, a TWITTER identifier (ID), and other data that is added to the profile automatically.

In one embodiment, data may be added to the entity profile by automatically pulling the data from a social network (e.g., the LINKEDIN service) and/or from other Internet or network services (e.g., this data may be added after the entity profile is associated with the user or user's mobile device following receipt of a triggering email as discussed above). As mentioned above, the entity profile may be associated with a plurality of various, different email addresses that an entity uses to communicate with its customers or other persons. For example, a server, mobile device, and/or other computing devices may be used to find or identify the email address "notification+f_s6yt2y@facebook.com" and to determine that that it is not a FACEBOOK employee, but rather is an email address used by the company FACEBOOK (e.g., this may be based on sufficient usage with other users such as seeing repeated usage a predetermined number of times and/or by observing other patterns).

In order to determine that the email address "notification+f_s6yt2y@facebook.com" is not for an individual FACEBOOK employee, but is instead an email or other communication of the company FACEBOOK as an entity, an automated or manual process may be used. For example, for a manual process it may be observed that this type of address appears in other users' data (e.g., observed by a central server managing information associated with several other users in addition to the user receiving a first, triggering email). Regular expression rules may be written to identify/capture these email addresses and associate them with an entity profile.

In an alternative embodiment, a service is provided in which the entity defines one or more aspects of the entity profile that will be customized for the user (e.g., functions that may be initiated by and/or information provided in the entity profile). For example, AMERICAN AIRLINES may define that it desires any user receiving an email from AMERICAN AIRLINES as an entity (or a related or affiliated entity) have an entity profile that displays Advantage airline miles and upcoming flights, and/or that permits updating a flight status from a link in sidebar 102. In one embodiment, the entity may provide an application that is to be downloaded to the user's computing device in response to the triggering email. This application may be a part of or separate from the entity profile. As an example, the entity may provide an application to run in sidebar 102.

Various specific, non-limiting examples of the creation of entity profiles and/or the presentation of entity profile information to a user of a computing device are now discussed below.

In one example, an email client of a user displays an email from a company, such as LINKEDIN, FACEBOOK, or AMAZON.COM. The user may view the corresponding entity profile for the company sending the email in sidebar 102, which displays some or all of the emails that the user has received from the company. The email addresses for these emails have previously been identified and associated with the entity profile. The entity profile may display other information in addition to these emails that is relevant to the user's personal relationship (e.g., as determined by online interactions and/or other voice or data communications) with the entity. The emails may be grouped, for example, by shipping confirmations, purchase notifications, billing notifications, etc., when being displayed in sidebar 102.

In another example, a user has an entity profile for AMERICAN AIRLINES. The profile displays information about the user's relationship with the company. The profile is populated (either before or after being associated with the user) with information such as, for example, the phone number of the front desk or the reservations line, even if the user has never called that number herself. Other information that may be used to populate the entity profile may include information such as number keys to press in order to navigate the phone directory tree of the entity in order to reach a live person. In one example, the information added to the entity profile may be the entity's TWITTER profile (e.g., done using the entity's TWITTER ID).

Figure 5:
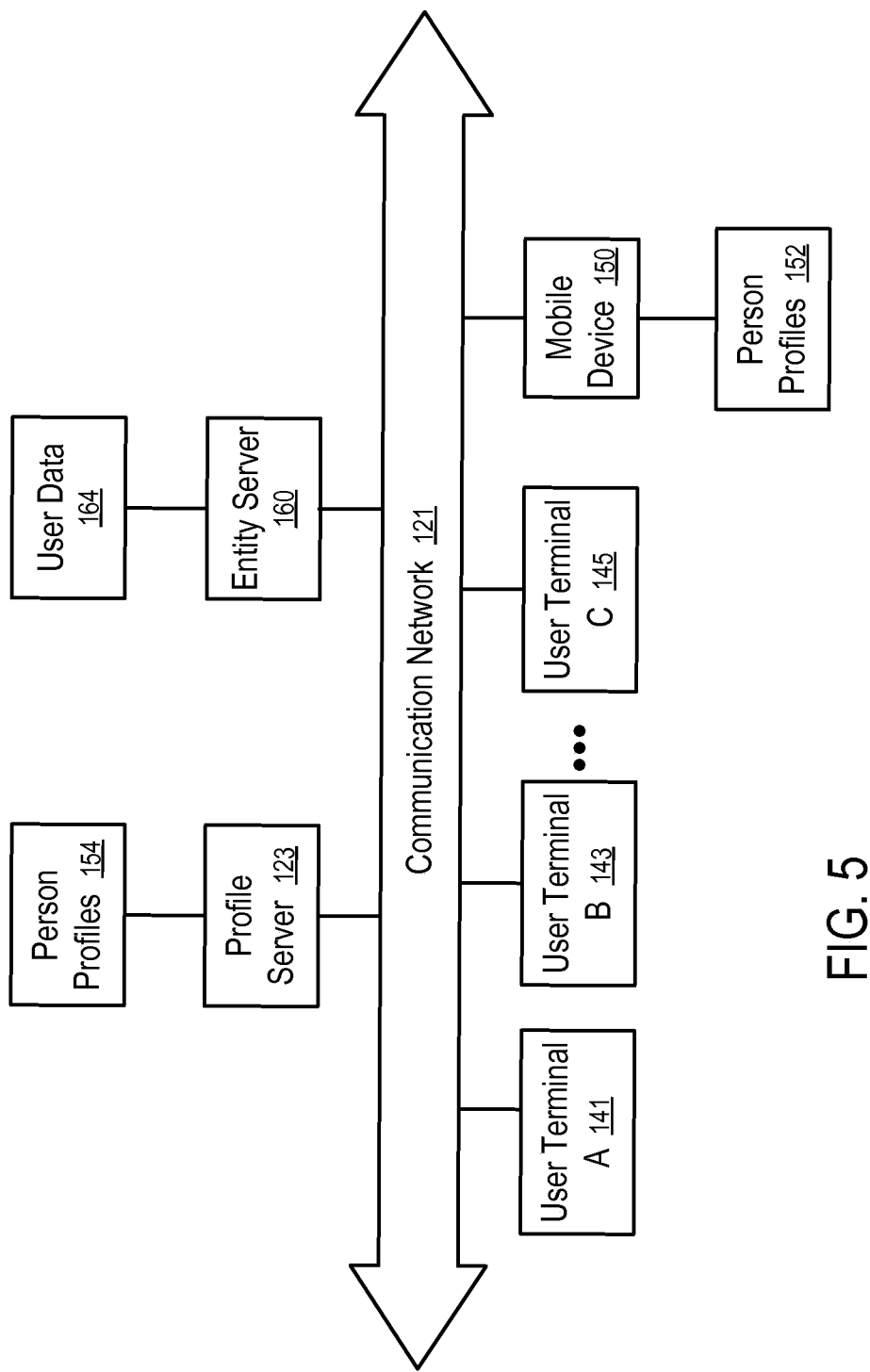
FIG. 5 shows a system for presentation of entity profile information to a user of a computing device, according to one embodiment.

FIG. 5 shows a system for presentation of entity profile information to a user of a computing device (e.g., profile information as illustrated in FIG. 1) in a user interface screen on a display of a computing device of the user (e.g., a mobile device 150 such as an IPHONE device), according to one embodiment. In FIG. 5, the user terminals (e.g., 141, 143, . . . , 145) and/or mobile devices including mobile device 150 are used to access a profile server 123 over a communication network 121. Although the foregoing description often uses a mobile device for purposes of illustration, the methods described herein may also be applied to user terminals and other forms of computing devices that interact with profile server 123.

The profile server 123 may include one or more web servers (or other types of data communication servers) to communicate with the user terminals (e.g., 141, 143, . . . , 145) and/or mobile devices. An entity server 160 is associated with an entity (e.g., AMERICAN AIRLINES or AMAZON.COM) and may provide an online service to mobile device 150 and other mobile devices. For example, entity server 160 may send communications (e.g., emails) to mobile device 150 and/or user terminal 141.

The profile server 123 and/or entity server 160 may each be connected to its own data storage facility to store user provided content, such as multimedia content, navigation data, preference data, etc. The profile server 123 may also store or have access to stored person profiles 154, created and updated as described herein. Person profiles may also be created and updated on mobile device 150 (and alternatively on both profile server 123 and mobile device 150, with some form of synchronization being used to keep the data synchronized).

Person profiles 154 (and/or person profiles 152) may be created and updated based on email or other communications to and from mobile device 150 and other mobile devices of various users (e.g., communications to or from entity server 160, or otherwise to or from an entity associated with entity server 160). In an alternative embodiment, person profiles 152 may be stored in a memory of mobile device 150. During operation, mobile device 150 may access and use person profiles obtained locally from mobile device 150 and/or obtained over communication network 121 from profile server 123. In one embodiment, profile server 123 sends one or more entity profiles to mobile device 150 or user terminal 141 for display to the user.

User data 164 (e.g., data regarding users that is stored at entity server 160 and used for providing an online or other service) may be accessed and used (e.g., by mobile device 150 and/or profile server 123) for relevancy rankings of entity profiles. In one embodiment, mobile device 150 or profile server 123 may access user data 164 or other data from entity server 160.

Although FIG. 5 illustrates an example system implemented in client server architecture, embodiments of the disclosure can be implemented in various alternative architectures. For example, the system can be implemented via a peer to peer network of user terminals, where content and data are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

Figure 6:
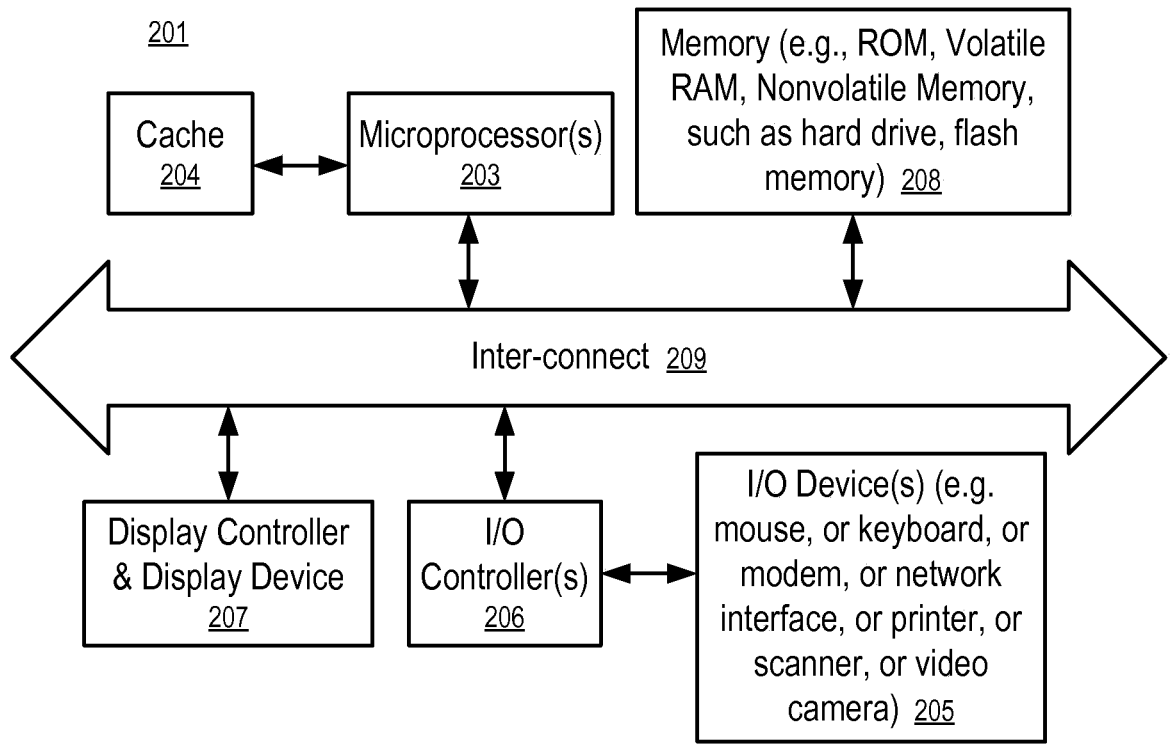
FIG. 6 shows a block diagram of a data processing system which can be used in various embodiments.

FIG. 6 shows a block diagram of a data processing system which can be used in various embodiments (e.g., to implement profile server 123 or entity server 160). While FIG. 6 illustrates various components of a computer system, it is not intended to represent any particular architecture or manner of interconnecting the components. Other systems that have fewer or more components may also be used.

In FIG. 6, the system 201 includes an inter-connect 209 (e.g., bus and system core logic), which interconnects a microprocessor(s) 203 and memory 208. The microprocessor 203 is coupled to cache memory 204 in the example of FIG. 6.

The inter-connect 209 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 209 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used. In one embodiment, a data processing system as illustrated in FIG. 6 is used to implement a server.

In one embodiment, a data processing system as illustrated in FIG. 6 is used to implement a user terminal. A user terminal may be in the form of a personal digital assistant (PDA), a cellular phone or other mobile device, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 7:
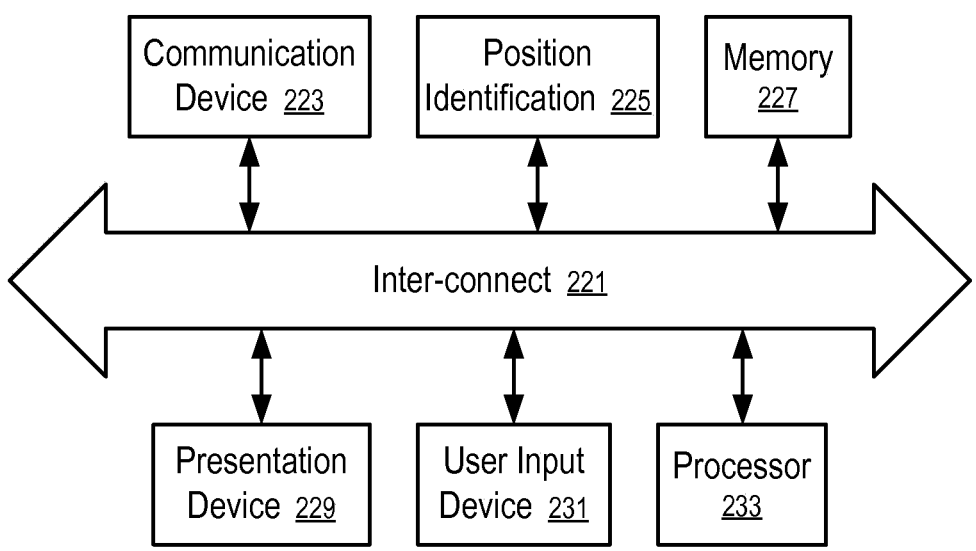
FIG. 7 shows a block diagram of a user device according to one embodiment.

FIG. 7 shows a block diagram of a user device (e.g., user terminal 141 or mobile device 150) according to one embodiment. In FIG. 7, the user device includes an inter-connect 221 connecting the presentation device 229, user input device 231, a processor 233, a memory 227, a position identification unit 225 and a communication device 223.

In FIG. 7, the position identification unit 225 is used to identify a geographic location for user content created for sharing. The position identification unit 225 may include a satellite positioning system receiver, such as a Global Positioning System (GPS) receiver, to automatically identify the current position of the user device.

In FIG. 7, the communication device 223 is configured to communicate with a server. In one embodiment, the user input device 231 is configured to generate user data content.

The user input device 231 may include a text input device, a still image camera, a video camera, and/or a sound recorder, etc.

Various further embodiments are now here described. In one embodiment, a method, comprises: receiving a communication associated with a first entity; in response to receiving the communication, creating or updating, by at least one processor, a first entity profile, wherein the first entity profile is for display to a user on a computing device of the user; and storing a plurality of entity profiles for entities, the entity profiles including the first entity profile.

In one embodiment, each of the entities is associated with communications received by the user of the computing device. In one embodiment, each of the entities associated with the communications received by the user is an entity selected from the group consisting of: an entity copied on one of the communications; an entity blind-copied on one of the communications; a sender of one of the communications; a recipient of one of the communications; and an entity referenced in the body, text, or other content of one of the communications. In one embodiment, the computing device is a mobile device, a desktop computer, a laptop, or a tablet.

In one embodiment, a server includes the at least one processor, and the method further comprises sending the first entity profile to the computing device for display. In one embodiment, the computing device includes the at least one processor, and the method further comprises presenting, using a display of the computing device, the first entity profile to the user.

In one embodiment, a non-transitory computer-readable storage medium stores computer-readable instructions, which when executed, cause a computing apparatus to: receive a first communication associated with a first entity; in response to receiving the first communication, create, by a computing device of a user, a first entity profile; and present, on a display of the computing device, the first entity profile to the user.

In one embodiment, the first entity profile comprises a list of communication addresses associated with the first entity, and the presenting comprises presenting the communication addresses to the user. In one embodiment, the instructions further cause the computing apparatus to receive information regarding an association of the list and the first entity from a computing device having associated the list with the first entity based on communications to or from the first entity with persons other than the user.

In one embodiment, the persons other than the user are mobile device users that have received communications from the first entity prior to the user having received the first communication. In one embodiment, the instructions further cause the computing apparatus to include information in the first entity profile that is extracted from the first communication and from subsequent communications to or from the first entity.

In one embodiment, the instructions further cause the computing apparatus to store a plurality of default entity profiles, and wherein the creating the first entity profile comprises customizing a first default entity profile of the plurality of default entity profiles, the first default entity profile corresponding to the first entity.

In one embodiment, a predetermined number of communications from the entity are required to be received by the computing device prior to the creating the first entity profile.

In one embodiment, a system includes: a display; at least one processor; and memory storing instructions configured to instruct the at least one processor to: receive a first communication associated with a first entity; in response to receiving the first communication, create a first entity profile; and present, on the display, the first entity profile for viewing by a user.

In one embodiment, the first entity profile comprises a list of communication addresses associated with the first entity, and the presenting comprises presenting the communication addresses to the user. In one embodiment, the instructions are further configured to instruct the at least one processor to receive information regarding an association of the list and the first entity from a server having associated the list with the first entity based on communications to or from the first entity for persons other than the user.

In one embodiment, the persons other than the user are mobile device users that have received communications from the first entity prior to the user having received the first communication. In one embodiment, the instructions further instruct the at least one processor to include information in the first entity profile that is extracted from the first communication and from subsequent communications to or from the first entity.

In one embodiment, the instructions further instruct the at least one processor to store a plurality of default entity profiles, and the creating the first entity profile comprises customizing a first default entity profile of the plurality of default entity profiles, the first default entity profile corresponding to the first entity.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, by a server, a plurality of communications sent by a first entity of a plurality of entities, the plurality of communications associated with a plurality of communication addresses, the plurality of communication addresses comprising sender addresses of the first entity;
identifying, by the server, patterns of matching text in a first set of communication addresses previously used to send communications to persons other than a user and in a social network of the user;
associating, by the server, the first set of communication addresses with the first entity based on the patterns;
determining that the user has received a new communication from the first entity, the new communication including a keyword in a body of the new communication;
determining the new communication as a triggering communication based at least in part on a presence of the keyword, the keyword indicative of a relevancy between the first entity and the user; and
creating, by the server, a first entity profile associated with the user, the first entity profile comprising the first plurality of communication addresses, an identification of the first entity, and the keyword.

2. The method of claim 1, further comprising customizing the first entity profile in response to receiving input from the user to initiate a communication with the first entity.

3. The method of claim 1, wherein the first entity profile comprises information specific to a relationship of the user with the first entity other than communication between the user and the first entity.

4. The method of claim 1, further comprising after creating the first entity profile, automatically pulling data from the social network, and adding the pulled data to the first entity profile.

5. The method of claim 1, wherein the first entity profile is created only after the user has received at least a predetermined number of two or more communications from the first entity.

6. The method of claim 1, further comprising transmitting, by the server to a computing device of the user, the first entity profile for storage on the computing device.

7. A non-transitory computer-readable storage medium storing computer-readable instructions, which when executed, cause a computing device to:
after the computing device has received a first communication from a first entity, receive, by the computing device, communication addresses previously used to send communications to persons other than a user, the communication addresses comprising sender addresses of the first entity and associated with the first entity based on identifying patterns of matching text appearing in each of the communication addresses;
store the communication addresses in a memory of the computing device;
in response to the user receiving a new communication from the first entity, the new communication including a keyword in a body of the new communication, determine by the computing device, the new communication as a triggering communication based at least in part on a presence of the keyword, the keyword indicative of a relevancy between the first entity and the user, and customize, by the computing device, a first entity profile for the user, the first entity profile comprising information specific to a user's relationship with the first entity other than communications between the user and the first entity; and
cause presentation, on a display for the user, of the first entity profile.

8. The non-transitory computer-readable storage medium of claim 7, wherein the first communication is received at a time after persons other than the user have received communications from the first entity.

9. The non-transitory computer-readable storage medium of claim 7, wherein the patterns comprising a text string in a first one of the communication addresses match a text string in a second one of the communication addresses.

10. The non-transitory computer-readable storage medium of claim 7, wherein the first entity profile further comprises the communication addresses.

11. The non-transitory computer-readable storage medium of claim 7, wherein the first entity profile further comprises a link for the user to initiate a service with a computing device of the first entity.

12. The non-transitory computer-readable storage medium of claim 7, wherein the instructions further cause the computing device to store a plurality of default entity profiles, and wherein the customizing the first entity profile further comprises customizing a first default entity profile of the plurality of default entity profiles.

13. The non-transitory computer-readable storage medium of claim 7, wherein a predetermined number of communications from the first entity are required to be received by the computing device of the user prior to the customizing of the first entity profile.

14. The non-transitory computer-readable storage medium of claim 7, wherein the instructions further cause the computing device to:
extract information from subsequent communications with the first entity; and
update the first entity profile using the extracted information.

15. A server, comprising:
a display;
at least one processor; and
memory storing instructions configured to instruct the at least one processor to:
receive a plurality of communications sent by a first entity of a plurality of entities, the plurality of communications associated with a plurality of communication addresses, the plurality of communication addresses comprising sender addresses of the first entity;
identify patterns of matching text in a first set of communication addresses previously used to send communications to persons other than a user and in a social network of the user;
associate the first set of communication addresses with the first entity based on the patterns;
determine that the user has received a new communication from the first entity, the new communication including a keyword in a body of the new communication;
determine the new communication as a triggering communication based at least in part on a presence of the keyword, the keyword indicative of a relevancy between the first entity and the user; and
cause customizing of a first entity profile for the user, the first entity profile comprising the first plurality of communication addresses, an identification of the first entity and the keyword.

16. The server of claim 15, wherein the instructions further instruct the at least one processor to add information to the first entity profile that is extracted from subsequent communications from the first entity.

17. The server of claim 15, wherein the instructions further instruct the at least one processor to store a plurality of default entity profiles, and the customizing the first entity profile further comprises customizing a first default entity profile of the plurality of default entity profiles, the first default entity profile corresponding to the first entity.

18. The server of claim 15, wherein the first entity profile further comprises information specific to a user's relationship with the first entity other than communications between the user and the first entity.

19. The server of claim 15, wherein the instructions further instruct the at least one processor to, after customizing the first entity profile, automatically pull data from a social network, and add the pulled data to the first entity profile.

20. The server of claim 15, wherein the first entity profile is customized only after the user has received at least a predetermined number of two or more communications from the first entity.

\* \* \* \* \*